US005487954A

United States Patent [19]
Chin et al.

[11] Patent Number: 5,487,954
[45] Date of Patent: Jan. 30, 1996

[54] NON-ACICULAR MODIFIED HIGH COERCIVITY IRON OXIDES FOR HIGH DENSITY MAGNETIC RECORDING AND THE PROCESSES OF MAKING THE SAME

[75] Inventors: Tsung-Shune Chin; Ming-Cheng Deng, both of Hsinchu, Taiwan

[73] Assignee: National Science Council, Taipei, Taiwan

[21] Appl. No.: 802,354

[22] Filed: Dec. 4, 1991

[51] Int. Cl.$^6$ .............................. G11B 5/66; C04B 35/00; C01G 49/02
[52] U.S. Cl. ............... 428/694 B; 428/694 BA; 428/694 BM; 428/900; 423/633; 423/636; 252/62.51; 252/62.56
[58] Field of Search ..................... 428/694, 900, 428/694 BA, 694 BK, 694 B; 252/62.51, 62.56; 423/633, 636

[56] References Cited

U.S. PATENT DOCUMENTS

| | | | |
|---|---|---|---|
| 3,928,709 | 12/1975 | Audran et al. | 428/539 |
| 4,015,030 | 3/1977 | Sasazawa | 427/130 |
| 4,178,387 | 12/1973 | Sasazawa | 252/62.56 |
| 4,255,492 | 3/1981 | Audran et al. | 428/694 |
| 4,323,621 | 4/1982 | Kober et al. | 428/216 |

OTHER PUBLICATIONS

C. D. Mee et al. in Magnetic Recording vol. 1, Technology Mc.Graw–Hill, 1987.

*Primary Examiner*—L. Kilman
*Attorney, Agent, or Firm*—Ladas & Parry

[57] ABSTRACT

The non-acicular modified maghemite and magnetite have high coercivity of, for the maghemite, up to 2200 Oe, saturation and residual magnetization of 63–85 emu/g and 43–52 emu/g, respectively; for the magnetite, the corresponding values are 800–1600 Oe, 82–87 emu/g, and 44–51 emu/g, respectively; while retaining same squareness ratio and same chemistry with conventional iron oxides, fine particle size of around 50 nm, easier dispersion and coating, invaried properties after curing, and low value of temperature coefficient of coercivity (0.24–0.37%/° C. for the maghemite and 0.20–0.33%/° C. for the magnetite), have been invented. They are thus especially suitable for high density recording. The modified maghemite and magnetite are prepared by precipitating from aqueous solution containing Fe, Mn, Co and Zn ions at proper ratio using an organic alkali as precipitant, followed by specific heat treatment sequences.

22 Claims, 4 Drawing Sheets

NON-ACICULAR MODIFIED HIGH COERCIVITY IRON OXIDES FOR HIGH DENSITY MAGNETIC RECORDING AND THE PROCESSES OF MAKING THE SAME

BACKGROUND OF THE INVENTION

The present invention relates to non-acicular modified iron oxides having high coercivity which is used for high density magnetic recording.

Magnetic recording is widely used in computer industries as main frame storage and diskettes, in home appliances as video or audio tapes and so on.

Coventionally, for audio purposes, acicular $\tau$-$Fe_2O_3$(maghemite) or $Fe_3O_4$(magnetite) with Hc of 200 to 400 Oe is applicable. For video purposes, Co-$\tau$-$Fe_2O_3$ with Hc of 600 to 800 Oe is available. However, for high density recording such as high quality and high density tapes and hard diskette, Co-$\tau$-$Fe_2O_3$ is no longer usable. Iron powder with Hc up to 1500 Oe is usually used. Particulates for next generation applications, for instance, the HDTV purposes, 3.5" and 2.5" ultra-high density diskette etc., seek for even higher coercivity and smaller particle size. Thin film and barium ferrite have been considered. (M. P. Sharrock, MRS Bulletin, Vol. XV, March 1990, P.53)

There are deficiencies for the above mentioned media:

1. For the conventional $\tau$-$Fe_2O_3$ (including the Co coated ones), besides of being low coercivity, dispersion is a problem due to their acicular shape. Magnetic field alignment is needed due also to their acicular shape.

2. The temperature coefficient of coercivity of Co doped $\tau$-$Fe_2O_3$ is very high. A. Eiling reported 0.46%/° C. for $\tau$-$Fe_2O_3$ surface-doped with Co (Hc=650 Oe) and 0.71%/° C. for body-doped ones (Hc=700 Oe) [IEEE Trans. Magn., MAG-23, No. 1, p.16 (1987)], while M. P. Sharrock reported 1.00%/° C. for Co body doped $\tau$-$Fe_2O_3$ and 0.2 to 0.5%/° C. for surface-doped ones [IEEE Trans. Magn., MAG-25, p.4374 (1989)].

3. For iron particle, the dispersion is even more serious than acicular oxides. It also has the problem of being easily oxidized or corroded.

4. For thin film media, sophisticated facility is required and surface coating is crucial.

5. For barium ferrites, the coercivity tends to be reduced after coating and curing. Besides, they are specifically applicable in perpendicular recording system.

In accordance with the cobalt containing iron oxide, U.S. Pat. No. 4,200,680 discloses a magnetic iron oxide prepared by coating the surface of needle-like particles of magnetic iron oxide with a cobalt compound, U.S. Pat. No. 4,179,387 discloses a process for preparing magnetic iron oxide containing Co which comprises dehydrating and reducing goethite containing Co, and oxidizing gradually the magnetite at a relatively low temperature of lower than about 100° C., in which the oxidation degree is about 30 to 80%. Another invention patent, U.S. Pat. No. 4,015,030, discloses a process for stabilizing a ferromagnetic material comprising heat-treating a needle-like ferromagnetic material.

There was a report presenting the preparation of modified maghemite by adding 2 to 5 wt % cobalt and 5 to 23 wt % manganese into the iron oxide using a special oxalic precursor and precipitated in alcoholic solvent followed by heat treatment [Ph. Tailhades et. al., IEEE Trans. Magn., MAG-26, 1822 (1990)]. The resultant acicular particulate (200 nm, aspect ratio 3) has a maximum coercivity of up to 1800 Oe with a residual magnetization value of 40 to 42 emu/g. However, no saturation magnetization value is shown.

The present invention is different from this report in that (1) much higher Co content is used, (2) non-acicular particulates are resulted, (3) no special precursor is required and aqueous solutions are available.

SUMMARY OF THE INVENTION

Therefore, it is a primary object of the present invention to provide non-acicular modified magnetite and maghemite for high density magnetic recording having high coercivity of up to 2200 Oe, and with extremely small temperature coefficient of coercivity.

It is another object of the present invention to provide a modified iron oxide having high saturation and residual magnetizations.

It is still another object of the present invention to provide modified iron oxide which is in fine particle size and retains same squareness ratio and same chemistry with conventional iron oxides, also have easier dispersion and coating (no need of an alignment field), invaried properties after curing, and resistant to accelerated aging.

For achieving the above-mentioned objects, non-acicular particulate media made of modified magnetite and maghemite are invented. They have coercivity of 800 to 2200 Oe, saturation magnetization (at 2 Tesla) of 63 to 85 emu/g, residual magnetization of 43 to 52 emu/g, squareness ratio of 0.62 to 0.75, controllable by dopants and heat treatments. They are highly resistant to curing at 150° C. as well as accelerated aging at 80° C. for 2 weeks, without any loss in coercivity. The modified iron oxides are prepared by doping Mn, Zn and Co using special precipitants followed by special heat treatment sequences. The particulates thus obtained is non-acicular of 30 to 80 nm (average 50 nm). Elongated particulate is also possible by controlling precipitation conditions (pH and temperature). It is thus especially suitable for high density magnetic recording.

DETAILED DESCRIPTION OF THE INVENTION

In this invention, non-acicular modified maghemite and magnetite have been developed. They are non-acicular hence are easier to be dispersed and easier coating since no alignment field is needed. They have coercivity ranging from 800 to 2200 Oe depending on the processing parameters to meet the industrial requirements. They have higher saturation and residual magnetizations while retaining same squareness ratio as compared with the conventional $\tau$-$Fe_2O_3$ and magnetite. The most important of all, it has the same chemistry as conventional $\tau$-$Fe_2O_3$ and magnetite such that they can be handled by the same facility and same chemicals as usual. Hence both the iron oxide particulate industries and recording industries can pick up easily without any other capital investments.

The modified iron-oxides are prepared by the general preparation processes as shown in the following steps.

1. Adding into a ferrous chloride solution suitable amounts of manganese, cobalt and zinc ions, usually as chlorides although nitrates and some sulfates can be used as well. The total amount of the doped ions should not exceed 40% of the total cations. (This step is denoted as P1)

2. Precipitation at 20° C. to 60° C. and a pH of 10 to 12 by adding the above solution into a suitable alkaline solution as the precipitant, to be specified in the following examples.

This is the key step. Only proper precipitants will do. Improper precipitants resulted in selective precipitation and hence varied composition. (P2)

3. Filtering the precipitate after maturing at 20° C. to 60° C. for certain periods, then washing by deionized water and drying. (P3)

4. Calcination at 500–600° C. for 2 hours in air. (P4)

5. Reduction at 320° C. for 1 hour under an atmosphere composed of nitrogen and hydrogen (1:1) saturated with water vapor to obtain a magnetite structure. (P5)

6. Oxidation at 350° C. to 400° C. in air for 2 hours to obtain the $\tau$-$Fe_2O_3$ structure, slow cooling or quenching into air afterwards. (P6)

7. Annealing at a temperature between 270° C. and 360° C. for 6 to 24 hours, or better between 300° C. and 320° C. for 8 to 16 hours, in air then air-cooled. In certain cases, this step was repeated at successively higher temperatures. And this is the last step of one of the final products with defect spinel structure, i.e., the maghemite. (P7)

8. Reduction at 300° C. to 340° C. for 1 hour again under an atmosphere of nitrogen and hydrogen (1:1) with saturated water vapor, to obtain the other final products with magnetite structure. (P8)

If $\tau$-$Fe_2O_3$ structure is the final product, steps (1) through (7) are enough. If magnetite structure is the final product, the final (8) step is necessary. There is by no means that high coercivity media with magnetite structure being obtainable by steps (1) through (5).

Magnetic properties of the media were measured by a vibrating sample magnetometer with a maximum applied field of 20000 Oe. The magnetization was calibrated against pure nickel. Whole M-H loops were recorded; Hc, Ms and Mr values were read from the loops directly. Measurements were done at room temperature. Temperature coefficient of coercivity (TCC) defined by:

$$TCC = d(Hc)/dT$$

was obtained by plotting the Hc vs. T(temperature) curve, and calculating the slope by a best fit. Coercivity at elevated temperatures was from the M-H loops measured isothermally at 25° C. to 150° C.

Composition was analyzed by an inductively coupled plasma (ICP) spectroscopy method.

This invention can be more fully understood by the following illustrative examples with accompanying figures, wherein.

EXAMPLE 1

In this example, the preparation of modified gamma-iron-oxide media will be given.

Chloride aqueous solutions with cation content as specified in Table I were used. By adding this solution into a triethylamine (TEA) or NaOH solution maintaining a pH of 10 at 20° C., precipitation occurred. Steps (2) to (7) in the general preparation processes were closely followed. The composition of the resultant media as analyzed by ICP is shown in Table II. The precipitated compositions are quite close to what expected.

TABLE I

Designation and nominal cation composition (in wt %) of the studied $\tau$-$Fe_2O_3$ media.

| Sample | Fe | Mn | Co | Zn |
|--------|------|------|------|-----|
| R0 | 85.5 | 10.0 | 4.5 | 0 |
| R1 | 77.6 | 14.4 | 8.0 | 0 |
| R2 | 75.1 | 14.4 | 10.5 | 0 |
| R3 | 73.6 | 14.4 | 12.0 | 0 |
| R4 | 70.6 | 14.4 | 15.0 | 0 |
| R5 | 67.6 | 14.4 | 18.0 | 0 |
| R6 | 70.0 | 18.0 | 12.0 | 0 |
| R7 | 73.6 | 10.8 | 12.0 | 3.6 |
| R8 | 70.6 | 10.8 | 15.0 | 3.6 |
| R9 | 70.6 | 12.4 | 15.0 | 2.0 |
| R10 | 76.0 | 12.0 | 12.0 | 0 |
| R11 | 78.0 | 10.0 | 12.0 | 0 |
| R12 | 80.0 | 8.0 | 12.0 | 0 |
| R13 | 82.0 | 6.0 | 12.0 | 0 |

Note: The total cations add to 100 wt %

TABLE II

| Sample | ICP analyzed composition | | | |
|--------|---------|---------|---------|---------|
|  | Fe (wt %) | Mn (wt %) | Co (wt %) | Zn (wt %) |
| R1 | 78.4 | 13.6 | 8.0 | — |
| R2 | 75.8 | 13.7 | 10.5 | — |
| R3 | 75.3 | 13.2 | 11.5 | — |
| R3a* | 75.1 | 13.1 | 11.8 | — |
| R4 | 71.1 | 14.2 | 14.7 | — |
| R5 | 67.8 | 14.0 | 18.2 | — |
| R7 | 73.9 | 10.4 | 12.1 | 3.6 |

*: R3 composition precipitated by NaOH.

Figure 1A:
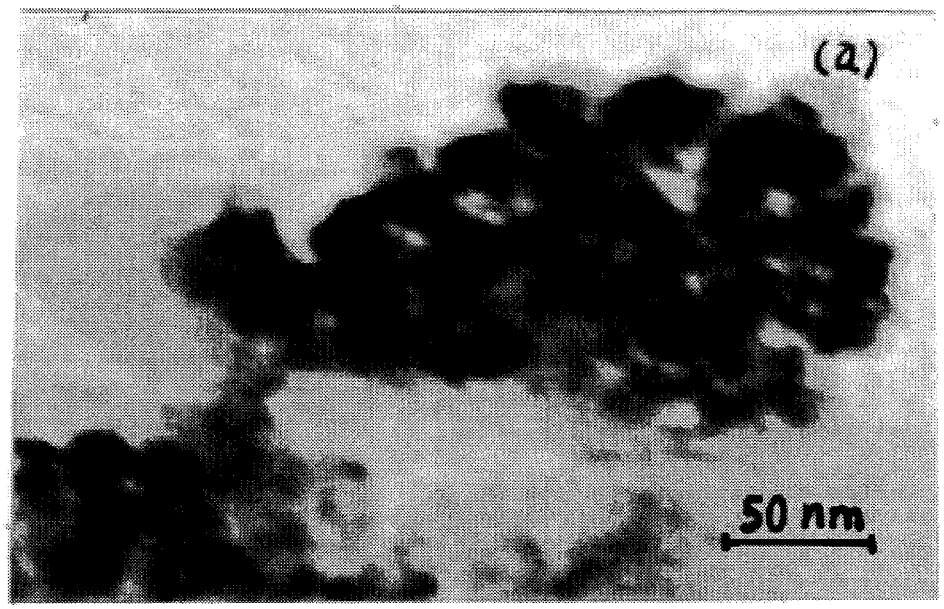
FIG. 1 is the morphology of (a) the precipitate and (b) resultant $\tau$-$Fe_2O_3$ media according to example 1.
Figure 1B:
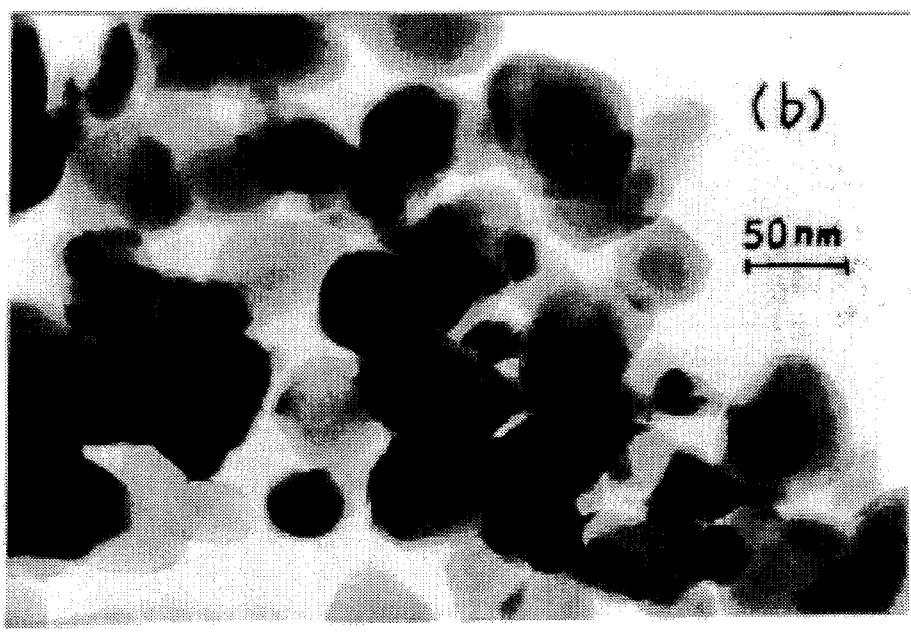
Figure 2:
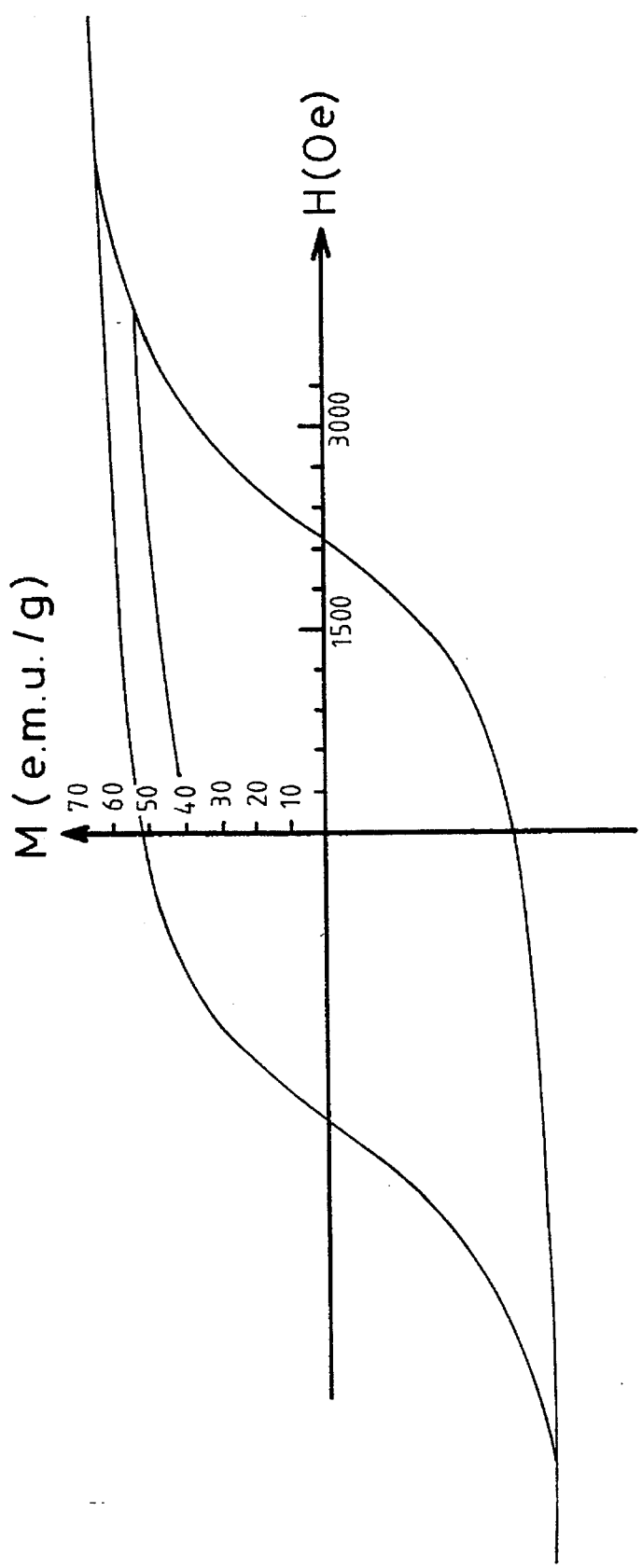
FIG. 2 is the typical M-H curve of modified $\tau$-$Fe_2O_3$ according to example 1.

The shape of the precipitate as-precipitated by TEA and the final media thereof are shown in FIG. 1. The particulate is non-acicular in shape, 30–80 nm in diameter, and has an average size of 50 nm. A typical M-H loop of the media is shown in FIG. 2. Magnetic properties of the media precipitated by TEA are shown in Table III. Intrinsic coercivity ranges from 800 to 2150 Oe, saturation magnetization is 63 to 72 emu/g, and residual magnetization is 43 to 52 emu/g, the squareness ratio is 0.62 to 0.74, varies with composition and thermal history. Co content of 12 wt % (R3) is optimal for coercivity and squareness ratio. The annealing at successively higher temperatures results in substantial improvement in coercivity (from 1390 to 2150 Oe). The addition of Zn enhances saturation magnetization to 75–78 emu/g, while lowers coercivity. The experiments have been repeated at least three times, with the results close to one another within experimental errors. Hence the reproducibility is good.

TABLE III

| Sample | Magnetic properties of resultant $\tau$-$Fe_2O_3$ | | | |
|--------|---------|---------|-----|-----|
|  | Process# | Hc (Oe)* | Ms* | Mr* | Mr/Ms* |
| R0 | P1 → P6, SC | 800 | 72 | 50 | 0.69 |
| R1 | i. P1 → P6, Q | 1050 | 72 | 52 | 0.72 |
|  | ii. i + P7, 270° C. × 8 h, Q | 1320 | 71 | 51 | 0.72 |
| R2 | i. P1 → P6, Q | 1260 | 67 | 47 | 0.70 |
|  | ii. i + P7, 270° C. × 2 h, Q | 1530 | 66 | 46 | 0.70 |
| R3 | i. P1 → P6, Q | 1390 | 70 | 50 | 0.71 |

TABLE III-continued

Magnetic properties of resultant $\tau$-Fe$_2$O$_3$

| Sample | Process# | Hc (Oe)* | Ms* | Mr* | Mr/Ms* |
|---|---|---|---|---|---|
| | ii. i + P7, 270° C. × 8 h, Q | 1820 | 70 | 50 | 0.71 |
| | iii. ii + 300° C. × 8 h, Q | 1960 | 63 | 45 | 0.71 |
| | iv. iii + 320° C. × 8 h, Q | 2120 | 65 | 47 | 0.72 |
| | v. iv + 340° C. × 8 h, Q | 2150 | 65 | 48 | 0.74 |
| | vi. v + 360° C. × 8 h, Q | 2150 | 69 | 46 | 0.67 |
| R3a@ | P1 → P6, Q (P2, NaOH) | 1030 | 70 | 45 | 0.64 |
| R4 | i. P1 → P6, Q | 1440 | 71 | 50 | 0.70 |
| | ii. i + P7, 300° C. × 2 h, Q | 1530 | 70 | 49 | 0.70 |
| | iii. ii + 340° C. × 8 h, Q | 1830 | 71 | 49 | 0.69 |
| R5 | i. P1 → P6, Q | 1200 | 72 | 45 | 0.62 |
| | ii. i + P7, 300° C. × 8 h, Q | 1600 | 72 | 45 | 0.62 |
| R5 | P1 → P6, SC | 1940 | 72 | 43 | 0.60 |
| R6 | P1 → P6, Q | 930 | 71 | 45 | 0.63 |
| R7 | i. P1 → P6, Q | 800 | 78 | 49 | 0.63 |
| | ii. i + P7, 270° C. × 8 h, Q | 950 | 77 | 49 | 0.64 |
| R8 | P1 → P6, Q | 855 | 76 | 46 | 0.60 |
| R8 | P1 → P6, SC | 1260 | 77 | 47 | 0.61 |
| R9 | i. P1 → P6, Q | 1010 | 75 | 47 | 0.63 |
| | ii. i + P7, 300° C. × 8 h, Q | 1370 | 72 | 46 | 0.64 |
| | iii. ii + 320° C. × 8 h, Q | 1270 | 76 | 50 | 0.66 |
| R10 | P1 → P6, Q | 1480 | 73 | 51 | 0.70 |
| R11 | P1 → P6, Q | 1440 | 73 | 51 | 0.70 |
| R12 | P1 -> P6, Q | 1405 | 75 | 51 | 0.69 |
| R13 | P1 -> P6, Q | 1275 | 73 | 50 | 0.68 |

P1 to P7 refers to steps (1) to (7) in the general preparation processes.
All the P3's are at 20° C., all the P4s are at 600° C.; SC: slow cooling of less than 10° C./hr; Q: air-quench
*Hc: coercivity
Ms and Mr: saturation and residual magnetization in emu/g; the Mr/Ms is the squareness ratio.
@Note: this is the R3 precipitated by NaOH.

Various coercivity ranges, e.g., 800 to 1200 Oe, 1200 to 1600 Oe, or 1600 to 2200 Oe etc., are obtainable by different combinations of composition and heat treatment. One very unique point in the present invention is that the squareness ratio can be equal to or higher than the Co coated $\tau$-Fe$_2$O$_3$.

No coercivity loss is observable at all after a simulated curing at 150° C. for up to 4 hours.

The R3a media precipitated by using NaOH shows inferior Hc, Mr and squareness ratio, comparing to those R3 precipitated by TEA, due to less homogeneous precipitation leading to regions rich in Co/Mn and regions lean in Co/Mn, although the overall composition does not vary much as analyzed by ICP.

Temperature coefficient of coercivity (TCC) values of the modified $\tau$-Fe$_2$O$_3$ media are summarized in Table IV. The TCC (0.24 to 0.37%/° C.) of the present modified $\tau$-Fe$_2$O$_3$ media are within the lower limit of the TCC range of conventional Co-$\tau$-Fe$_2$O$_3$ media (surface doped ones), while much improvement is achieved as compared to the body doped ones (0.7 to 1.0%/° C.). This is another uniqueness of this part of the present invention. Zn addition (eg., R9) greatly decreases the TCC value, i.e., increases the thermal stability of the media.

TABLE IV

TCC of the modified $\tau$-Fe$_2$O$_3$

| Sample | R3 | R4 | R9 | Co-$\tau$-Fe$_2$O$_3$* | $\tau$-(Fe,Co)$_2$O$_3$# |
|---|---|---|---|---|---|
| -TCC(%/°C.) | 0.37 | 0.34 | 0.24 | 0.2 to 0.5 | 0.7 to 1.0 |

*Co surface doped $\tau$-Fe$_2$O$_3$, 0.46 according to A. Eiling [IEEE Trans. Magn., MAG-23, P. 16 (1987)], or 0.2 to 0.5 according to M. P. Sharrock [IEEE Trans. Magn., MAG-25, P. 4374 (1989)].
Co body doped $\tau$-Fe$_2$O$_3$, 0.71 according to A. Eiling, 1.0 according to M. P. Sharrock.

The modified $\tau$-Fe$_2$O$_3$ media thus obtained have intrinsic coercivity (Hc) of 800 to 2200 Oe, saturation magnetization (Ms) of 65 to 78 emu/g, residual magnetization (Mr) of 45 to 52 emu/g, depending on the doped amount of manganese, cobalt and zinc, as well as heat treatments, as elucidated in this example.

EXAMPLE 2

In this example, the preparation of modified magnetites will be given.

Chloride aqueous solutions with weight percentage of cations to be specified in Table V were used. By adding this solution into the TEA solution maintaining a pH of 10 at room temperature, precipitation occurred. Steps 2 through 8 in the general preparation processes were followed closely.

TABLE V

Designation and composition of the modified magnetites studied (in wt %).

| Sample | Fe | Mn | Co | Zn | Fe | Mn | Co | Zn |
|---|---|---|---|---|---|---|---|---|
| | (nominal, wt %) | | | | (ICP analyzed, wt %) | | | |
| S1 | 76.6 | 14.4 | 9 | 0 | 77.8 | 14.0 | 8.2 | — |
| S2 | 73.6 | 14.4 | 12 | 0 | 75.3 | 13.2 | 11.5 | — |
| S3 | 70.6 | 14.4 | 15 | 0 | 72.5 | 13.8 | 14.8 | — |
| S4 | 70.6 | 12.4 | 15 | 2 | 71.1 | 12.0 | 14.8 | 2.1 |
| S5 | 70.0 | 18.0 | 12 | 0 | — | — | — | — |
| S6 | 76.0 | 12.0 | 12 | 0 | 76.9 | 11.6 | 11.5 | — |
| S7 | 78.0 | 10.0 | 12 | 0 | 79.1 | 9.4 | 11.5 | — |
| S8 | 82.0 | 6.0 | 12 | 0 | 82.3 | 5.9 | 11.6 | — |

Figure 3A:
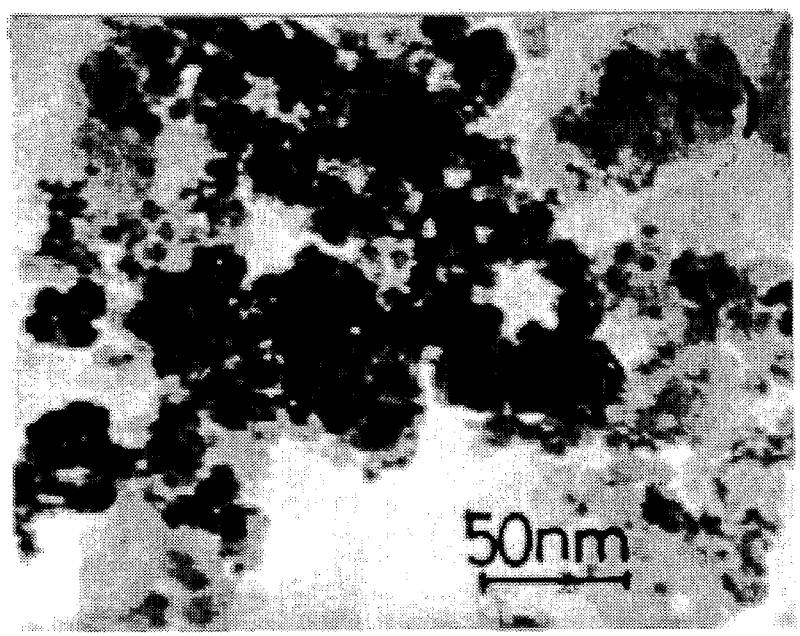
FIG. 3 is the morphology of (a) the precipitate and (b) resultant $Fe_3O_4$ media according to example 2.
Figure 3B:
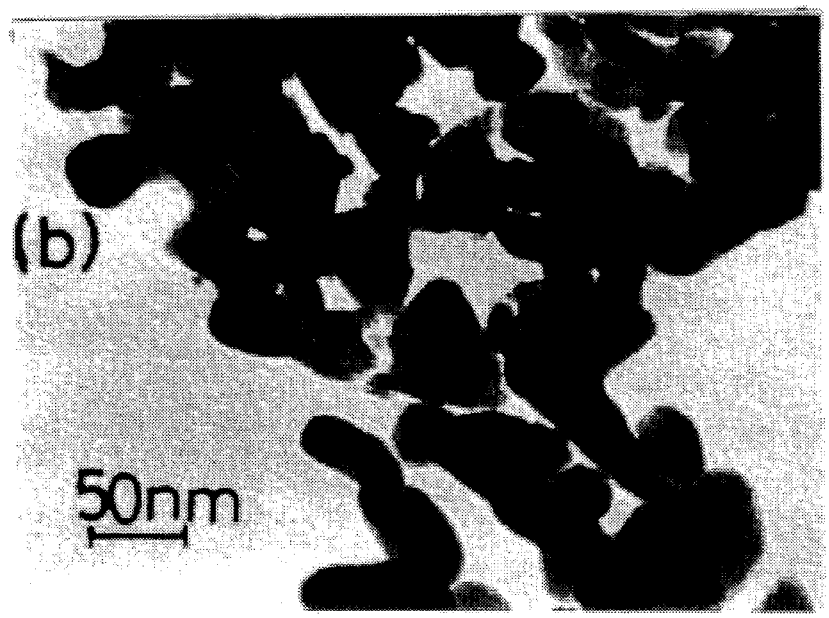
Figure 4:
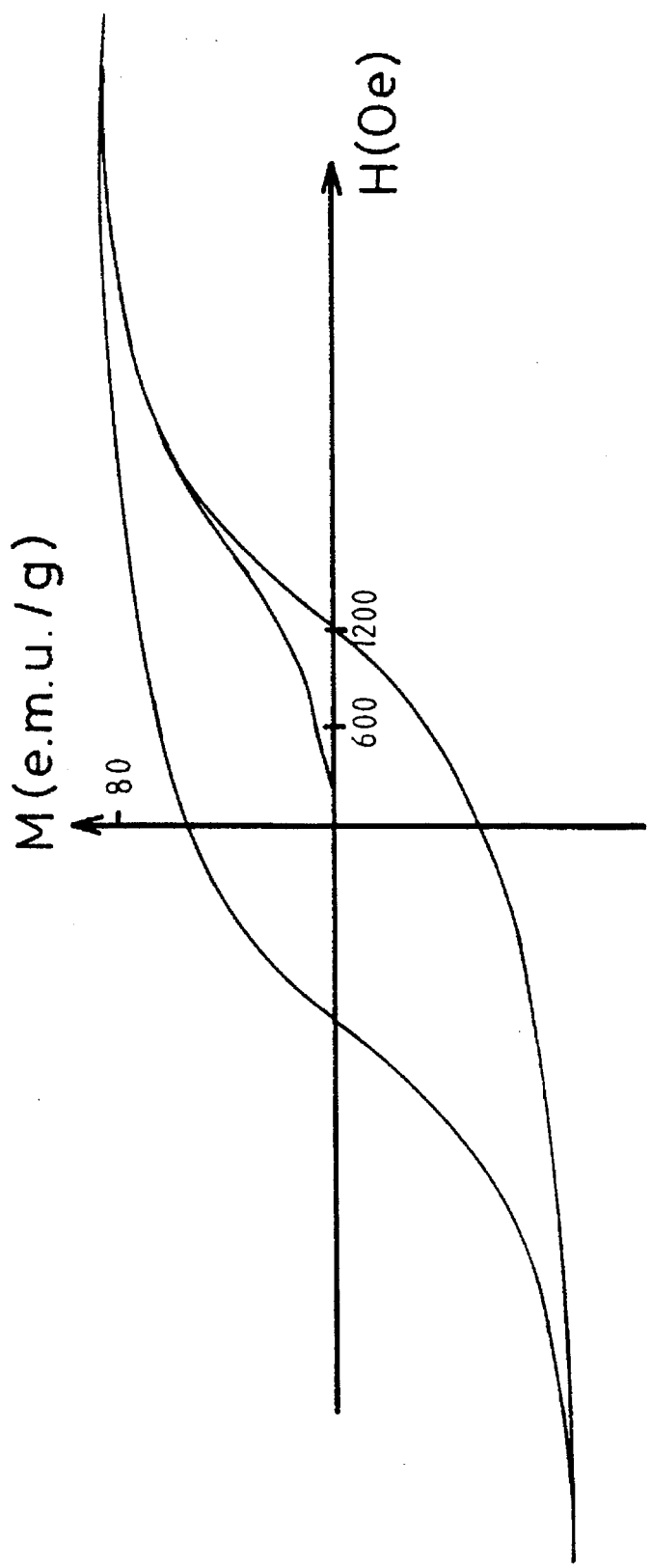
FIG. 4 is the typical M-H curve of modified $Fe_3O_4$ according to example 2.

The shape of the precipitate and resultant media are shown in FIG. 3 and typical M-H loops in FIG. 4. The particulate is non-acicular in shape, 30 to 80 nm in diameter and has an average size also of 50 nm. Magnetic properties are shown in Table VI.

TABLE VI

Magnetic properties of the (Fe, Mn, Co)$_3$O$_4$ and the (Fe, Mn, Co, Zn)$_3$O$_4$ particulates air-cooled after final reduction (step 8)

| Sample | S1 | S2 | S3 | S4 | S5 | S6 | S7 | S8 |
|---|---|---|---|---|---|---|---|---|
| Ms (emu/g) | 87.3 | 82.5 | 82.7 | 83.2 | 81.9 | 82.1 | 83.9 | 82.9 |
| Mr (emu/g) | 47.9 | 50.1 | 44.6 | 40.3 | 50.8 | 45.6 | 45.0 | 45.9 |
| Hc (Oe) | 800 | 1320 | 1200 | 1050 | 1320 | 1460 | 1500 | 1560 |
| Mr/Ms | 0.55 | 0.61 | 0.54 | 0.48 | 0.58 | 0.56 | 0.54 | 0.55 |

Ms: Saturation Magnetization
Mr: Residual Magnetization
Hc: coercivity
Mr/Ms: squareness ratio Among S1, S2 and S3 (constant Mn content of 14.4 wt %), an optimum Co content of 12% results in the highest coercivity of 1320 Oe, and the Ms at 20 kOe keeps in the vicinity of 82 to 87 emu/g for all the Co contents. The residual magnetization (Mr) are higher than 44 emu/g, and in some cases up to 50 emu/g. The squareness ratio varies from 0.54 to 0.61. The lowering of Mn content from from 14.4 to 6 wt %, keeping Co content constant at 12 wt %, raises linearly the coercivity of the resultant magnetite. As a consequence, the magnetite with 6 wt % Mn and 12 wt % Co has a maximum Hc of 1560 Oe, together with high Ms of 82.9 emu/g and Mr of 45.9 emu/g. The experiments have been repeated at least 3 times, with the results close to one another, within experimental errors. Hence the reproducibility is good.

EXAMPLE 3

In this example, the effectiveness of different precipitants will be given by evaluating magnetic properties of the resultant modified maghemite.

The chloride solution R3 in Table I of Example 1 was chosen. By adding this solution into one of the precipitants of trimethylamine (TMA), tripropylamine (TPA), pyridine (PYR), ethylendiamine (EDA), 1,2-diaminopropane (DAP), N,N,N'N'-tetramethylethylenediamine (TMEDA) and TEA+ NaOH (T+N), etc., at room temperature and a pH of 10, precipitation occurred. Steps 2 through 6 in the general preparation processes were followed closely. The results are presented in Table VII.

TABLE VII

The comparison among effectiveness of different precipitants (nominal cation composition, in wt %, is 14.4 Mn, 12 Co), magnetic properties shown are after P6 processing and quenched in air without further annealing.

|  | precipitate# | | composition by ICP | Hc(Oe) | Ms | Mr | Mr/Ms |
| --- | --- | --- | --- | --- | --- | --- | --- |
| TEA | L.A. | G.→D.B. | 13.2 Mn, 11.5 Co | 1390 | 70 | 50 | 0.71 |
| TMA | M.A. | G.→D.B. | 14.7 Mn, 12.5 Co | 1110 | 57 | 33 | 0.58 |
| TPA | L.A. | G. | 13.2 Mn, 12.3 Co | 1000 | 69 | 48 | 0.70 |
| PYR | S.A. | D.B. | 1.30 Mn, 0.36 Co | 210 | 82 | 45 | 0.56 |
| EDA | S.A. | D.B. | 11.4 Mn, 0.44 Co | 150 | 71 | 41 | 0.58 |
| T + N | L.A. | G.→D.B. | 14.7 Mn, 12.4 Co | 1235 | 45 | 26 | 0.58 |
| DAP | S.A. | D.B. | 9.5 Mn, 0.47 Co | 260 | 7.7 | 3 | 0.44 |
| TMEDA | L.A. | G. | 12.2 Mn, 11.1 Co | 1260 | 60 | 39 | 0.64 |

L.A.: large amount of precipitate; M.A.: medium amount; S.A.: small amount; G.: green; D.B.: dark brown; G→D.B.: green turned to dark brown after stirring.

An additional doping of 2 wt % Zn to the 15% Co, 12.4% Mn composition (i.e. S4) results in slight increase in saturation magnetization, however lowered residual magnetization, coercivity and squareness, as shown in Table VI.

The temperature coefficient of coercivity (TCC), which were calculated from the slope of Hc vs. T curve, of the samples are shown in Table VII.

TABLE VII

TCC for some studied composition of the (Fe, Mn, Co, Zn)$_3$O$_4$ particulates

| sample | S1 | S3 | S4 | S5 | S6 | S7 | S8 |
| --- | --- | --- | --- | --- | --- | --- | --- |
| —TCC (%/°C.) | 0.30 | 0.30 | 0.28 | 0.27 | 0.26 | 0.20 | 0.33 |

The temperature coefficient of coercivity (TCC) shown in Table VII is 0.30%/° C. for S3 and 0.20%/° C. for S7. All the TCC values are very low as compared with the prior art. The addition of Zn improves TCC slightly though lowered residual magnetization and coercivity.

The coercivity and squareness ratio of the modified magnetites are inferior to the corresponding modified maghemite of the same composition and thermal history. However saturation magnetization are much higher in each case. This makes them available in many application, eg., high density video tapes.

One very unique point in this part of the present invention is that the high performance magnetites can only be obtainable by reducing the high performance modified maghemite. Modified magnetites do not respond to annealing (the p7 process) well.

It is clear that precipitant TMA, TPA, TEA+NaOH, and TMEDA are also available for precipitating the modified iron oxides with magnetic properties close to one another, although are inferior to those obtained form TEA alone. The compositions of the precipitates obtained from the above available precipitants vary from case to case. However, considering the experimental error in chemical analyses, they are still acceptable. While compositions of the precipitates obtained from pyridine, EDA and DAP have been completely different, resulting in unacceptable magnetic properties.

While the preferred embodiments has been described, variations thereto will occur to those skilled in the art within the scope of the present inventive concepts which are delineated by the following claims.

We claim:

1. A method for preparing a non-acicular modified iron oxide with a general formula gamma—(Fe, M)$_2$O$_3$, wherein M are doped elements to replace iron and are chosen from the group consisting of manganese, cobalt and zinc, having high coercivity for high density recording, said method comprising the steps of:

(a) adding M-salts into an acrueous solution of ferrous chloride, wherein the total amount of M-ions is 15 to 40 weight percent, corresponding to 14.5 to 39 atomic percent, of the total cations; wherein said manganese dopant is 4 to 20 weight percent corresponding to 4.1 to 20.5 atomic percent, said cobalt dopant is 4 to 22 weight percent corresponding to 3.5 to 21 atomic percent, and said zinc dopant is 0.5 to 4 weight percent corresponding to 0.3 to 3.6 atomic percent;

(b) precipitating said solution by adding an amine containing alkaline solution selected from the group consisting of triethylamine, trimethylamine,tripropylamine, and NNN'N'-tetramethylethylenediamine, and having a pH of 10 to 12 at 20° C. to 60° C.;

(c) filtering the precipitate after maturing at 20° C. to 60° C. for at least 10 minutes, then washing said precipitate with deionized water and drying;

(d) calcinating said precipitate at 400° C. to 600° C. for approximately 2 hours in air;

(e) reducing said precipitate at 320° C. for approximately 1 hour in an atmosphere composed of nitrogen and hydrogen (1:1) saturated with water vapor to obtain a magnetite structure;

(f) oxidizing said magnetite structure at 350° C. to 400° C. in air for approximately 2 hours to obtain a maghemite structure, and cooling in a furnace or in air afterwards; and (g) annealing said maghemite at a temperature between 270° C. and 360° C. for 6 to 24 hours in air then air cooling.

2. The method as claimed in claim 1, wherein said manganese dopant is 8 to 16 weight percent, corresponding to 8.2 to 16.4 atomic percent, of the total cations.

3. The method as claimed in claim 1, wherein said cobalt dopant is 8 to 18 weight percent, corresponding to 7.5 to 17.4 atomic percent, of the total cations.

4. The method as claimed in claim 1, wherein said zinc dopant is 2 to 3 weight percent, corresponding to 1.7 to 2.7 atomic percent, of the total cations.

5. The method as claimed in claim 1, wherein said alkaline solution is triethylamine.

6. The method as claimed in claim 1, wherein said maghemite is annealed at 300° to 320° C. for 8 to 16 hours.

7. The method of claim 1 wherein step (g) is further repeated at least once at a temperature at least 20° C. higher than the former annealing temperature.

8. A magnetic recording medium made of non-acicular modified iron oxide having high coercivity and with a general formula of gamma $(Fe,M)_2O_3$, wherein M are doped elements to replace iron and are chosen from the group consisting of manganese, cobalt and zinc wherein the total amount of M-ions is 15 to 40 weight percent, corresponding to 14.5 to 39 atomic percent, of the total cations; wherein said manganese dopant is 4 to 20 weight percent corresponding to 4.1 to 20.5 atomic percent, said cobalt dopant is 4 to 22 weight percent corresponding to 3.5 to 21 atomic percent and said zinc dopant is 0.5 to 4 weight percent corresponding to 0.3 to 3.6 atomic percent.

9. The modified iron oxide as claimed in claim 8, wherein said manganese dopant is 8 to 16 weight percent, corresponding to 8.2 to 16.4 atomic percent, of the total cations.

10. The modified iron oxide as claimed in claim 8, wherein said cobalt dopant is 8 to 18 weight percent, corresponding to 1.7 to 2.7 atomic percent, of the total cations.

11. The modified iron oxide as claimed in claim 8, wherein said zinc dopant is 2 to 3 weigh percent, corresponding to 1.7 to 2.7 atomic percent, of the total cations.

12. A method for preparing a non-acicular modified iron oxide with a general formula gamma—$(Fe,M)_2O_3$, wherein M are doped elements to replace iron and are chosen from the group consisting of manganese, cobalt and zinc, having coercivity for high density recording, said method comprising the steps of:

(a) adding water soluble M-salts into an aqueous solution of ferrous chloride, wherein the total amount of the M-ions is 15 to 40 weight percent, corresponding to 14.5 to 39 atomic percent, of the total cations; wherein said manganese dopant is 4 to 20 weight percent corresponding to 4.1 to 20.5 atomic percent, said cobalt dopant is 4 to 22 weight percent corresponding to 3.5 to 21 atomic percent, and said zinc dopant is 0.5 to 4 weight percent corresponding to 0.3 to 3.6 atomic percent;

(b) precipitating said solution by adding an amine containing alkaline solution selected from the group consisting of triethylamine, trimethylamine, tripropylamine, and NNN'N'-tetramethylethylenediamine, and having a pH of 10 to 12 at 20° C. to 60° C.;

(c) filtering the precipitate after maturing at 20° C. to 60° C. for at least 10 minutes, then washing said precipitate with deionized water and drying;

(d) calcinating said precipitate at 400° C. to 600° C. for approximately 2 hours in air;

(e) reducing said precipitate at 320° C. for approximately 1 hour in an atmosphere composed of nitrogen and hydrogen (1:1) saturated with water vapor to obtain a magnetite structure;

(f) oxidizing said magnetite structure at 350° C. to 400° C. in air for approximately 2 hours to obtain a maghemite structure, and cooling in a furnace or in air afterwards;

(g) annealing said maghemite at a temperature between 270° C. and 360° C. for 6 to 24 hours in air then air cooling; and (h) reducing said maghemite at 300° C. to 340° C. for approximately 1 hour again under an atmosphere of nitrogen and hydrogen (1:1) with saturated water vapor, to obtain a magnetite structure.

13. The modified iron oxide as claimed in claim 12, wherein said manganese dopant is 8 to 16 weight percent, corresponding to 8.2 to 16.4 atomic percent, of the total cations.

14. The modified iron oxide as claimed in claim 12, wherein said cobalt dopant is 8 to 18 weight percent, corresponding to 7.5 to 17.4 atomic percent, of the total cations.

15. The modified iron oxide as claimed in claim 12, wherein said zinc dopant is 2 to 3 weigh percent, corresponding to 0.8 to 1.3 atomic percent, of the total cations.

16. The method of claim 12 wherein step (g) is further repeated at least once at a temperature at least 20° C. higher than the former annealing temperature.

17. The method as claimed in claim 12, wherein said alkaline solution is triethylamine.

18. The method as claimed in claim 12, wherein said maghemite is annealed at 300° to 320° C. for 8 to 16 hours.

19. A magnetic recording medium made of non-acicular modified iron oxide having high coercivity and with a general formula of $(Fe,M)_2O_3$, wherein M are doped elements to replace iron and are chosen from the group consisting of manganese, cobalt and zinc wherein the total amount of M-ions is 15 to 40 weight percent corresponding to 14.5 to 0.39 atomic percent of the total cation; wherein said manganese dopant is 4 to 20 weight percent corresponding to 4.1 to 20.5 atomic percent, said cobalt dopant is 4 to 22 weight percent corresponding to 3.5 to 21 atomic percent and said zinc dopant is 0.5 to 4 weight percent corresponding to 0.3 to 3.6 atomic percent.

20. The modified iron oxide as claimed in claim 19, wherein said manganese dopant is 8 to 16 weight percent, corresponding to 8.2 to 16.4 atomic percent, of the total cations.

21. The modified iron oxide as claimed in claim 19, wherein said cobalt dopant is 8 to 18 weight percent, corresponding to 7.5 to 17.4 atomic percent, of the total cations.

22. The modified iron oxide as claimed in claim 19, wherein said zinc dopant is 2 to 3 weigh percent, corresponding to 0.7 to 1.7 atomic percent, of the total cations.

* * * * *